United States Patent
Tsuchihashi et al.

(10) Patent No.: US 11,245,347 B2
(45) Date of Patent: Feb. 8, 2022

(54) DRIVING CIRCUIT AND DRIVING METHOD OF STEPPING MOTOR AND ELECTRONIC MACHINE USING THE SAME

(71) Applicant: ROHM CO., LTD., Kyoto (JP)

(72) Inventors: Masanori Tsuchihashi, Kyoto (JP); Mitsuo Okada, Kyoto (JP); Ryota Kobayashi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 20 days.

(21) Appl. No.: 16/798,641

(22) Filed: Feb. 24, 2020

(65) Prior Publication Data

US 2020/0274469 A1 Aug. 27, 2020

(30) Foreign Application Priority Data

Feb. 26, 2019 (JP) .............................. JP2019-032805

(51) Int. Cl.
*H02P 8/22* (2006.01)
*H02P 8/18* (2006.01)

(52) U.S. Cl.
CPC . *H02P 8/22* (2013.01); *H02P 8/18* (2013.01)

(58) Field of Classification Search
CPC .............. H02P 6/18; H02P 8/12; G04C 3/143
See application file for complete search history.

(56) References Cited

U.S. PATENT DOCUMENTS

| 7,391,174 | B2 | 6/2008 | Son |
| 7,609,015 | B2 | 10/2009 | Okui |
| 8,598,824 | B2 | 12/2013 | Ito et al. |
| 8,659,259 | B2 * | 2/2014 | Suda .................. H02P 8/12 318/696 |

(Continued)

FOREIGN PATENT DOCUMENTS

| JP | H09103096 A | 4/1997 |
| JP | 2000184798 A | 6/2000 |

(Continued)

OTHER PUBLICATIONS

USPTO Ex Parte Quayle Action for corresponding U.S. Appl. No. 16/815,645 Dated, Jun. 28, 2021.

(Continued)

*Primary Examiner* — Said Bouziane
(74) *Attorney, Agent, or Firm* — Cantor Colburn LLP (57) ABSTRACT

The present invention relates to a driving circuit and a driving method for a stepping motor, and an electronic machine using the same. A current value setting circuit generates a current setting value. A constant current chopper circuit generates a pulse modulation signal, which pulse-width modulates by having a detection value of a coil current flowing through a coil approach close to the current setting value. A logic circuit controls a bridge circuit connected to the coil of the stepping motor according to the pulse modulation signal. The current value setting circuit sets the current setting value to a predetermined full-torque setting value in a first period after rotation starts, reduces the current setting value to a predetermined second setting value less than the first setting value in the following second period, and switches to a high-efficiency mode and adjusts the current setting value by means of feedback control.

11 Claims, 9 Drawing Sheets

(56) References Cited

U.S. PATENT DOCUMENTS

| | | | |
|---|---|---|---|
| 2009/0206788 A1* | 8/2009 | Ando | H02P 8/32 |
| | | | 318/696 |
| 2015/0123591 A1 | 5/2015 | Inoue | |
| 2015/0214878 A1* | 7/2015 | Takada | H02P 8/38 |
| | | | 318/696 |
| 2016/0231139 A1 | 8/2016 | Mizutani | |
| 2020/0083827 A1* | 3/2020 | Yamazaki | H02P 8/32 |
| 2020/0287492 A1* | 9/2020 | Sega | H02P 23/14 |

FOREIGN PATENT DOCUMENTS

| | | |
|---|---|---|
| JP | 2004120957 A | 4/2004 |
| JP | 2004180354 A | 6/2004 |
| JP | 6258004 B2 | 1/2018 |

OTHER PUBLICATIONS

USPTO Non-Final Office Action for corresponding U.S. Appl. No. 16/798,812 dated, Jun. 7, 2021.
USPTO Notice of Allowance for corresponding U.S. Appl. No. 16/815,645; dated Oct. 6, 2021.

\* cited by examiner

DRIVING CIRCUIT AND DRIVING METHOD OF STEPPING MOTOR AND ELECTRONIC MACHINE USING THE SAME

CROSS REFERENCE TO RELATED APPLICATIONS

The present invention claims priority under 35 U.S.C. § 119 to Japanese Application No. 2019-032805 filed Feb. 26, 2019, the entire content of which is incorporated herein by reference.

BACKGROUND OF THE INVENTION

Field of the Invention

The present invention relates to a driving technology for a stepping motor.

Description of the Prior Art

Stepping motors are extensively applied in electronic machines, industrial machinery, and robots. Stepping motors are synchronous motors that rotate synchronously with an input clock generated by a host controller, and have excellent control properties in starting, stopping and positioning. Thus, stepping motors can realize position control in an open loop, and even feature suitability for digital signal processing.

Figure 1:
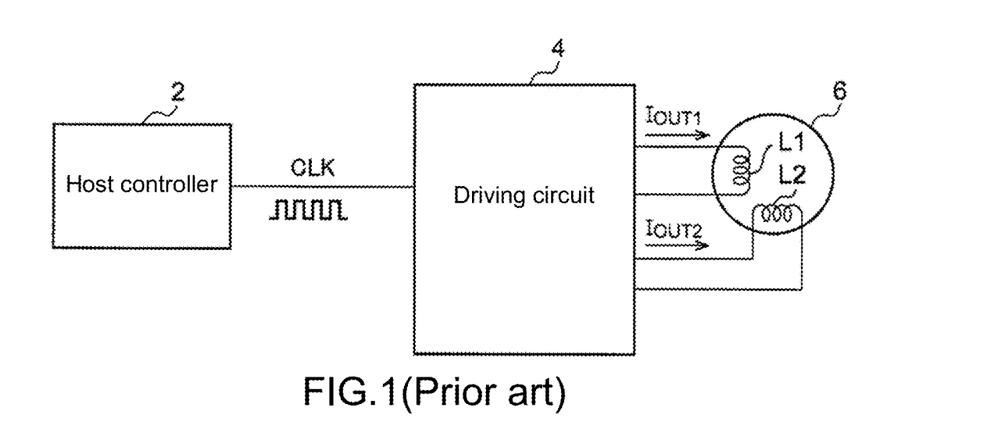
FIG. 1 is a block diagram of a conventional stepping motor and a motor system of a driving circuit thereof.

FIG. 1 shows a block diagram of a conventional stepping motor and a motor system of a driving circuit thereof. A host controller 2 supplies an input clock CLK to a driving circuit 4. The driving circuit 4 changes the excitation position in synchronization with the input clock CLK.

Figure 2:
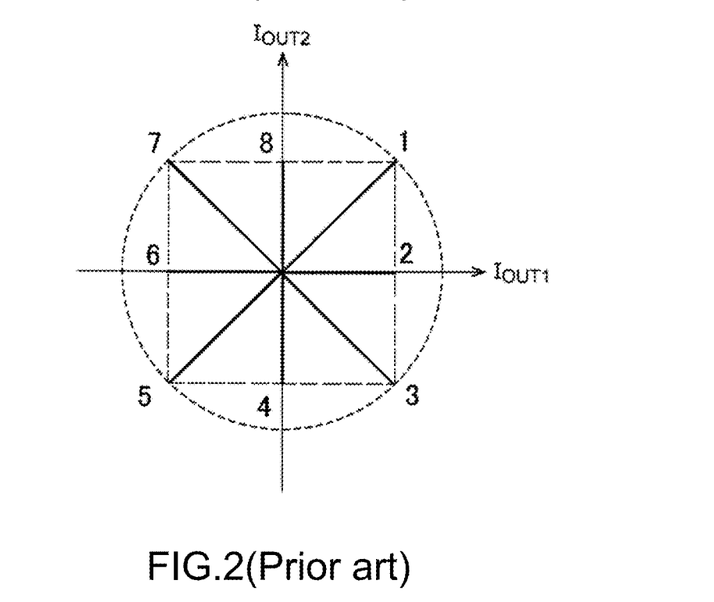
FIG. 2 is a diagram illustrating excitation positions.

FIG. 2 shows a diagram illustrating the excitation position. The excitation position is regarded as a combination of coil currents (driving currents) $I_{OUT1}$ and $I_{OUT2}$ flowing through two coils L1 and L2 of a stepping motor 6. In FIG. 2, eight excitation positions 1 to 8 are depicted. In 1-phase excitation, current alternately flows in the first coil L1 and the second coil L2, thus changing the excitation position to 2, 4, 6 and 8. In 2-phase excitation, current alternately flows in the first coil L1 and the second coil L2, thus changing the excitation position to 1, 3, 5 and 7. 1-2-phase excitation is a combination of 1-phase excitation and 2-phase excitation, and causes the excitation position to change among 1 and 8. In micro-step driving, the excitation position is even more finely controlled.

In a normal state, a rotor of a stepping motor rotates synchronously in a unit of a step angle directly proportional to the number of input clocks. However, if a drastic change in the load or speed occurs, deviation from the synchronization is produced and such is referred to as "out-of-step". Once out-of-step happens, special processing needs to be performed in order to drive the stepping motor normally. Thus, avoiding out-of-step is desired.

To solve this issue, under most circumstances, a margin is configured for an ideal maximum load, and a driving circuit is designed by a method that takes into account an output torque of an out-of-step margin. However, power loss is also increased if the margin is increased.

Patent document 5 proposes a technique as follows—out-of-step is avoided, while an output torque (i.e., a current amount) is optimized by means of feedback control, hence reducing power consumption and improving efficiency.

PRIOR ART DOCUMENTS

Patent Publication

[Patent document 1] Japan Patent Publication No. JPH09103096

[Patent document 2] Japan Patent Publication No. JP2004-120957

[Patent document 3] Japan Patent Publication No. JP2000-184789

[Patent document 4] Japan Patent Publication No. JP2004-180354

[Patent document 5] Japan Patent Publication No. JP6258004

SUMMARY OF THE INVENTION

Problems to be Solved by the Invention

Figure 3:
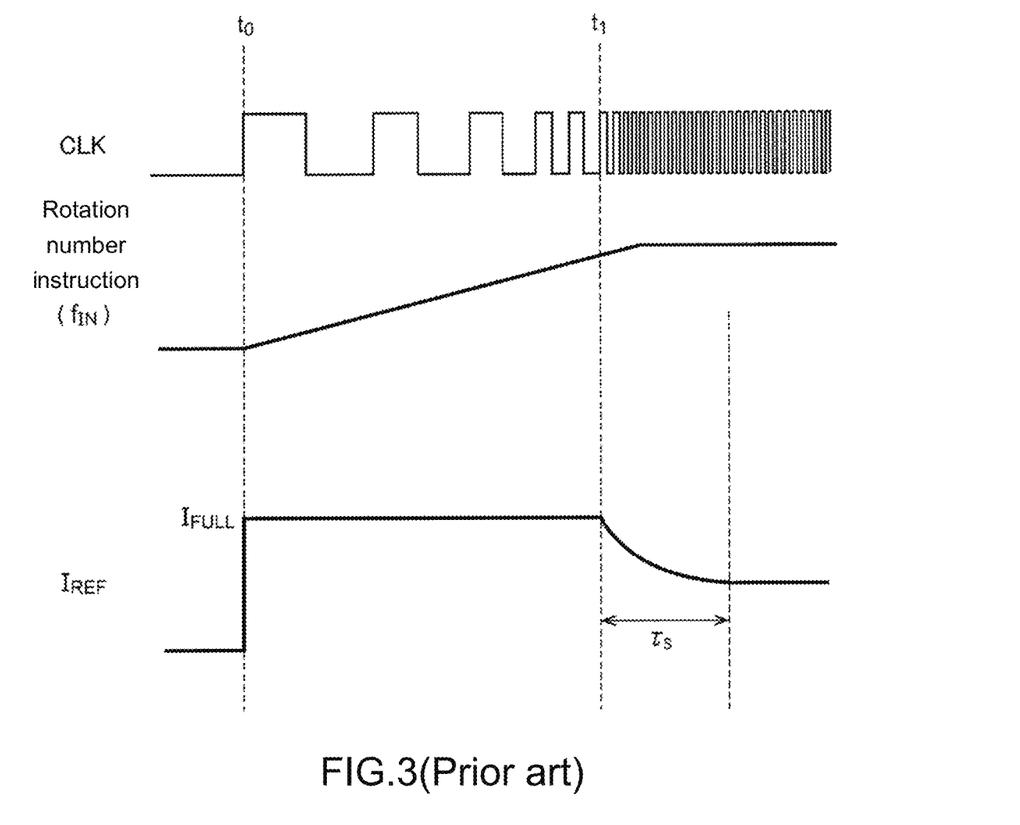
FIG. 3 is a diagram for illustrating a sequence of startup of a stepping motor.

FIG. 3 shows a diagram for illustrating a sequence of startup of a stepping motor. When an input clock signal IN is provided at a time point to, the motor starts. The frequency of the input clock signal IN, that is, the rotation number instruction for the motor, increases with time (trapezoidal wave drive). Out-of-step is particularly likely to occur during the initial startup, and thus feedback control of the output torque is made ineffective and the motor is driver by a maximum torque (maximum current). More specifically, a current setting value $I_{REF}$ is set to a maximum value $I_{FULL}$. Then, as the rotation of the motor is stabilized, feedback control of the output torque (driving current) is switched to being effective at a time point $t_1$. By means of feedback control, the current setting value $I_{REF}$ is caused to approach close to a most appropriate current amount $I_{OPT}$ corresponding to a current load, and is stabilized.

After the time point $t_1$, the current setting value $I_{REF}$ is adjusted by means of feedback control, and hence a stabilizing time (delay time) $\tau_S$ is needed for the current setting value $I_{REF}$ to be stabilized at the most appropriate current amount $I_{OPT}$. In order to further reduce power consumption, reducing the stabilizing time $\tau_S$ is desired.

The present invention is accomplished in view of this issue. One object of an exemplary embodiment of the present invention is to provide a driving circuit capable of optimizing a current setting value within a short time.

Technical Means for Solving the Problem

A driving circuit for a stepping motor is provided according to an implementation form of the present invention. The driving circuit includes: a current value setting circuit, generating a current setting value; a constant current chopper circuit, generating a pulse modulation signal, which pulse-width modulates by way of having a detection value of a coil current flowing through a coil approach close to a target value of the current setting value; and a logic circuit, controlling a bridge circuit connected to the stepping motor according to the pulse modulation signal. The current value setting circuit sets the current setting value to a predetermined first setting value in a first period after rotation starts, reduces the current setting value according to a predetermined method to a predetermined second setting value less than the first setting value in a following second period, and then switches to a high-efficiency mode and adjusts the current setting value by means of feedback control.

A convergence value of the current setting value under the high-efficiency mode can be predicted (including measurement and calculation) according to a load of the stepping motor. Further, the predicted convergence value is used and provided as the second setting value, enabling the current setting value to change to the predicted convergence value within a short time in the second period. Then, with switch to the high-efficiency mode, the current setting value can converge to an actual convergence value within a short time. Thus, the current setting value is optimized within a short time.

The current setting value allows the current setting value to change from the first setting value to the second setting value in N steps (where N is more than or equal to 2) in the second period. The number N of the steps is variable.

The current value setting circuit can include: a calculation portion, generating at least one intermediate value acquired by internally dividing the first setting value and the second setting value; a multiplexer, receiving the second setting value and at least one setting value, and selecting one corresponding to control data from the setting values; and a waveform controller, changing the control data along with time in the second period.

The steps can have equal widths.

The logic circuit can generate a mask signal regulating triggering of the transition from the first period to the second period according to a period of an input clock.

The driving circuit can further include a counter-electromotive force (EMF) detection circuit for detecting a counter-EMF generated by the coil. The current value setting circuit can perform feedback control on the current setting value in the high-efficiency mode according to the counter-EMF.

The current value setting circuit can further include: a load angle estimating portion, determining a load angle according to the counter-EMF; and a feedback controller, generating the current setting value by way of having the estimated load angle approach close to a target angle.

The driving circuit can be integrated on a semiconductor substrate. The term "integrated" includes a situation where all constituent elements of the circuit are formed on the semiconductor substrate and a situation where main constituent elements of the circuit are integrated; alternatively, a part of resistors or capacitors can be provided outside the semiconductor substrate so as to adjust circuit constants. By integrating the circuit in one chip, circuit area can be reduced while preserving balanced characteristics of circuit elements.

An electronic machine is provided according to another implementation form of the present invention. The electronic machine includes a stepping motor, and a driving circuit according to any one of the above for driving the stepping motor.

Further, any combination of the constituent elements above, and any invention derived from mutual substitutions made to the constituent elements of the invention and methods, devices and systems presented therefrom are also considered as effective embodiments of the present invention.

Effects of the Invention

According to an implementation form of the present invention, a current setting value can be optimized within a short time.

DETAILED DESCRIPTION OF THE EMBODIMENTS

Details of the present invention are given in preferred embodiments with the accompanying drawings below. The same or equivalent constituent elements, components, or processes depicted in the drawings are represented by the same denotations, and repeated description is appropriately omitted. Further, the embodiments are examples that do not form limitations to the present invention. All features stated in the embodiments and any combination thereof are not necessarily essential features of the present invention.

In the description, "a state of component A being connected to component B" includes, in addition to a situation where component A and component B are directly physically connected, a situation where component A and component B are indirectly connected by other components, in a way that no substantial influences are produced on the electrical connection state thereof or no damage on functions and effects produced thereby in combination is resulted.

Similarly, "a state of component C being arranged between component A and component B" includes, in addition to a situation where component A and component C or component B and component C are directly connected, a situation where the components are indirectly connected by other components, in a way that no substantial influences are produced on the electrical connection state thereof or no damage on functions and effects produced thereby in combination is resulted.

For better understanding, the vertical and horizontal axes of waveform diagrams and timing diagrams referred in the description are appropriately scaled up or scaled down. Further, the waveforms depicted are simplified, exaggerated or emphasized for better understanding.

Figure 4:
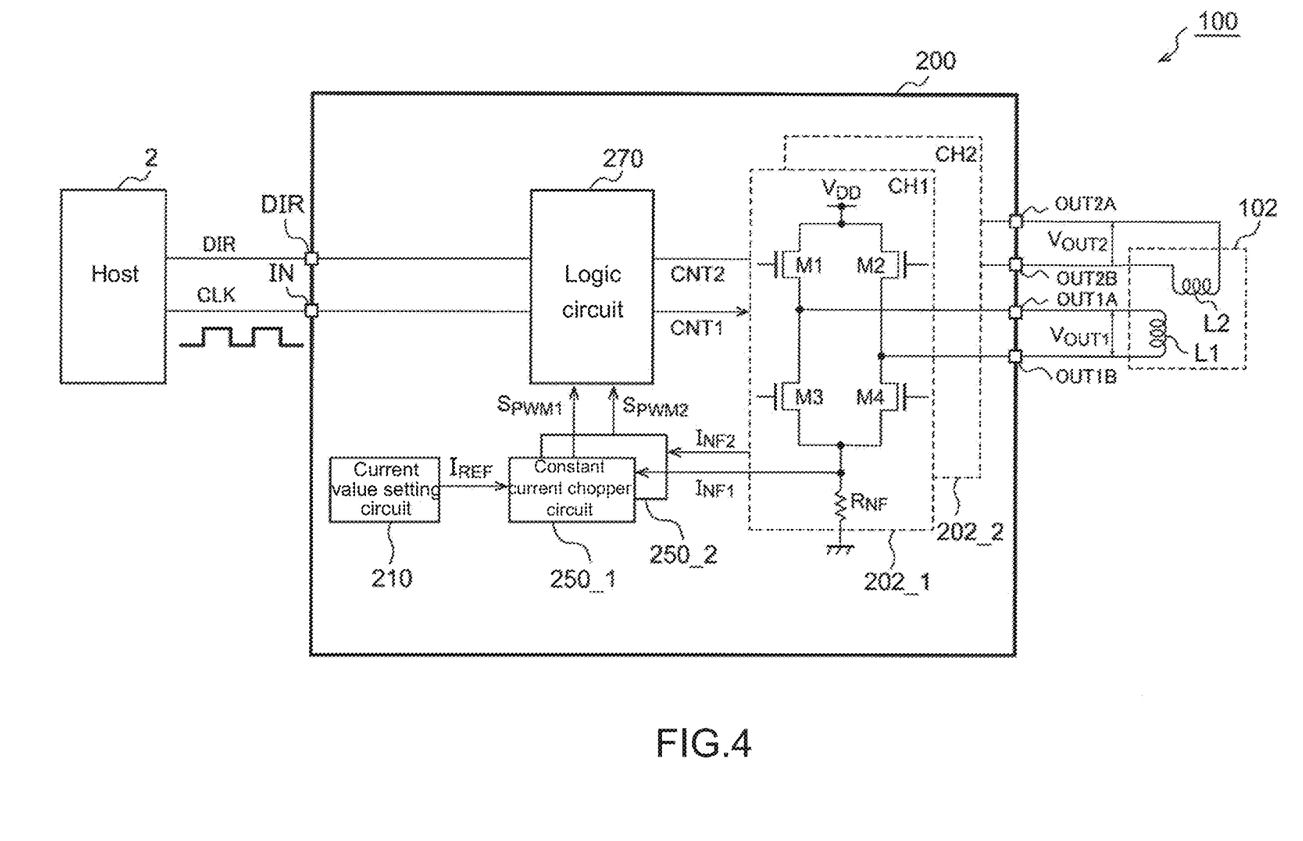
FIG. 4 is a block diagram of a driving circuit according to an embodiment.

FIG. 4 shows a block diagram of a structure of a driving circuit 200 according to an embodiment. The driving circuit 200 and a stepping motor 102 jointly form a motor system 100. The stepping motor 102 can be any of a permanent magnet (PM) type, a variable reluctance (VR) type, and a hybrid type.

The input clock CLK is inputted from the host controller 2 to an input pin IN of the driving circuit 200. Further, a direction indication signal DIR indicating a clockwise (CW) direction or a counterclockwise (CCW) direction is inputted to a direction indication pin DIR of the driving circuit 200.

Each time when the input clock CLK is inputted to the driving circuit 200, a rotor of the stepping motor 102 rotates toward a direction corresponding to the direction indication signal DIR by a predetermined angle.

The driving circuit 200 includes bridge circuits 202_1 and 202_2, a current value setting circuit 210, constant current chopper circuits 250_1 and 250_2, and a logic circuit 270, which are integrated on one semiconductor substrate.

In this embodiment, the stepping motor 102 is a 2-phase motor, and includes a first coil L1 and a second coil L2. The driving method of the driving circuit 200 is not specifically defined. In this embodiment, a bipolar driving method is used to support 2-phase excitation, 12-phase excitation and micro-step driver.

The bridge circuit 202_1 of a first channel CH1 is connected to the first coil L1. The bridge circuit 202_2 of a second channel CH2 is connected to the second coil L2.

Each of the bridge circuits 202_1 and 2022 includes four transistors M1 to M4, and an H-bridge circuit (a full-bridge circuit) of a pre-driver (not shown). The transistors M1 to M4 of the bridge circuit 202_1 are switched according to a control signal CNT1 from the logic circuit 270, accordingly switching the voltage (also referred to as a first coil voltage) $V_{OUT1}$ of the first coil L1.

The bridge circuit 202_2 is identically structured as the bridge circuit 202_1, the transistors M1 to M4 thereof are switched according to a control signal CNT2 from the logic circuit 270, accordingly switching the voltage (also referred to as a second coil voltage) $V_{OUT2}$ of the second coil L2.

The current value setting circuit 210 generates a current setting value $I_{REF}$. The constant current chopper circuit 250_1 generates a pulse modulation signal $S_{PWM1}$ while electricity passes through the first coil L1, wherein the pulse modulation signal $S_{PWM1}$ pulse-width modulates by way of having a detection value $I_{NF1}$ of a coil current $I_{L1}$ flowing through the first coil L1 approach close to a target value of the current setting value $I_{REF}$. The constant current chopper circuit 250_2 generates a pulse modulation signal $S_{PWM2}$ while electricity passes through the second coil L2, wherein the pulse modulation signal $S_{PWM2}$ pulse-width modulates by way of having a detection value $I_{NF2}$ of a coil current $I_{L2}$ flowing through the second coil L2 approach close to the target value of the current setting value $I_{REF}$.

Each of the bridge circuits 202_1 and 202_2 includes a current detection resistor $R_{NF}$, and the voltage of the current detection resistor $R_{NF}$ reduces to become a detection value of the coil current IL. Further, the position of the current detection resistor $R_{NF}$ is not limited, and the current detection resistor $R_{NF}$ can be configured on a power side, or be connected to the coils in series and be configured between two outputs of the bridge circuits.

The logic circuit 270 controls the bridge circuit 202_1 connected to the first coil L1 according to the pulse modulation signal $S_{PWM1}$. Further, the logic circuit 270 controls the bridge circuit 202_2 connected to the second coil L2 according to the pulse modulation signal $S_{PWM2}$.

Each time when the input clock CLK is inputted to the logic circuit 270, the excitation position is changed and the coil (or coil pair) supplying current is switched. The excitation position is considered as a combination of the values of the respective coil currents of the first coil L1 and the second coil L2 and the direction. The excitation position can be changed according to a positive edge or a negative edge of the input clock CLK, or can be changed according to both the edges thereof.

The current value setting circuit 210 sets the current setting value $I_{REF}$ to a predetermined first setting value (to be referred to as a full-torque setting value hereinafter) $I_{FULL}$ in a first period $T_1$ after rotation starts, reduces the current setting value $I_{REF}$ by a predetermined method to a predetermined second setting value (to be referred to as a high-efficiency setting value) $I_{LOW}$ less than the full-torque setting value $I_{FULL}$ in a following second period $T_2$, and generates a mask signal MASK in the driving circuit 200 to regulate triggering of the transition from the first period $T_1$ to the second period $T_2$.

A timing generator for generating the mask signal MASK is provided in the motor driving circuit 200. The timing generator includes, for example, a counter counting the period of the input clock CLK. If the period of the input clock CLK is persistently stable for multiple cycles, the level of the mask signal MASK can be changed to have transition from the first period $T_1$ to the second period $T_2$. Further, if a predetermined time period has passed, or if a predetermined number of the input clock CLK has been inputted, the current value setting circuit 210 can switch to a high-efficiency mode.

Then, the current value setting circuit 210 switches to a high-efficiency mode, and adjusts the current setting value $I_{REF}$ by means of feedback control.

Figure 5A:
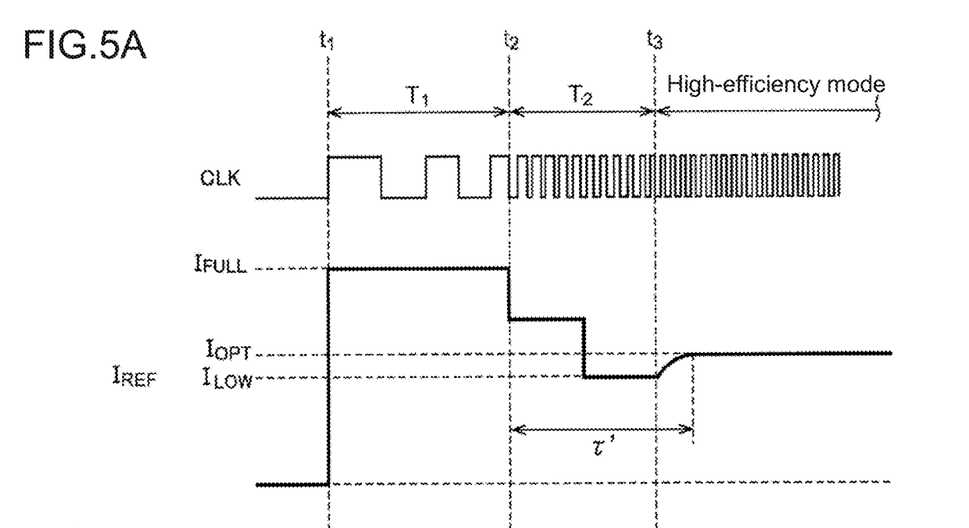
FIG. 5A is a waveform diagram of the operation of the driving circuit in FIG. 4.

The structure of the driving circuit 200 is as above, and the operation thereof is to be described below. FIG. 5A shows a waveform diagram of the operation of the driving circuit 200 in FIG. 4.

Figure 5B:
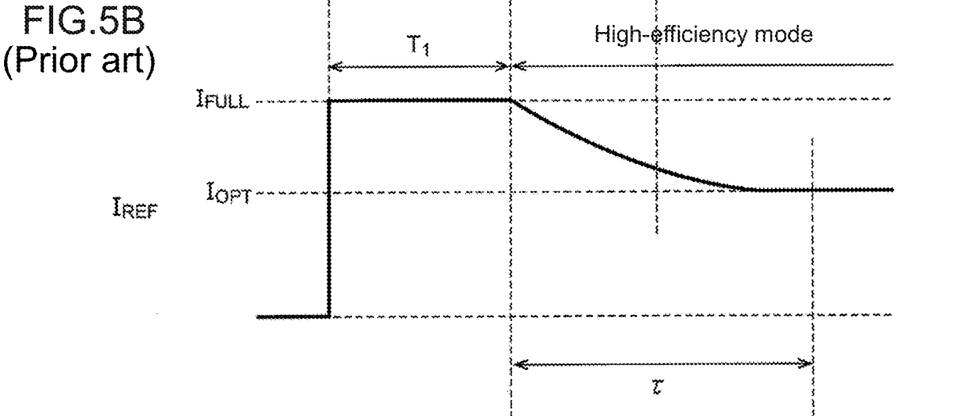
FIG. 5B is a waveform diagram of the operation of a conventional driving circuit.

To better demonstrate the effect of the driving circuit 200, the operation of a conventional driving circuit is illustrated again with reference to FIG. 5B. Conventionally, in the first period $T_1$, switch to a high-efficiency mode is immediately performed once the current setting value $I_{REF}$ is fixed at the full-torque setting value $I_{FULL}$. Due to a large deviation of the full-torque setting value $I_{FULL}$ from the convergence value $I_{OPT}$, the delay time τ from the current setting value $I_{REF}$ to convergence can be extremely long.

Referring to FIG. 5A, the operation of the driving circuit 200 in FIG. 4 is described. At a time $t_0$, the input clock CLK is inputted, which becomes an instruction for starting rotation. In a first period $T_1$ shortly after the startup, the current setting value $I_{REF}$ becomes the full-torque setting value $I_{FULL}$. A larger margin with which out-of-step does not happen is considered and provided when the full-torque setting value $I_{FULL}$ is specified. The full-torque setting value $I_{FULL}$ can be a maximum value of a configurable current range. In this case, driving is performed by using maximum torque shortly after the startup.

At a time point $t_2$, the process enters a second period $T_2$. In the second period $T_2$, the current setting value $I_{REF}$ reduces toward the high-efficiency setting value $I_{LOW}$. In this embodiment, the current setting value $I_{REF}$ passes through one intermediate value and changes in a stepped manner, wherein the intermediate value is a middle point between the full-torque setting value $I_{FULL}$ and the high-efficiency setting value $I_{LOW}$.

At a time point $t_3$, the second period $T_2$ ends, and the process enters a high-efficiency mode. In the high-efficiency mode, the current setting value $I_{REF}$ is adjusted by means of feedback control and converted to the most appropriate value $I_{OPT}$ in a constant state. The time τ needed for the convergence is less than the delay time τ in FIG. 5B.

The above description is the operation of the driving circuit 200, and the advantages thereof are to be described below.

In the high-efficiency mode, the convergence value $I_{OPT}$ of the current setting value $I_{REF}$ can be predicted (including by measurement and calculation) according to a load of the stepping motor. Further, by setting a predicted convergence value $I_{OPT\hat{}}$ as the high-efficiency setting value $I_{LOW}$, the current setting value $I_{REF}$ can be changed to the predicted convergence value $I_{OPT}\hat{}$ within a short time in the second period $T_2$. The predicted convergence value $I_{OPT}\hat{}$ is close to the actual convergence value $I_{OPT}$, and thus the current setting value $I_{REF}$ can be converged to the actual convergence value $I_{OPT}$ within a short time after the switching to the high-efficiency mode.

The present invention can be understood on the basis of the block diagram and circuit diagram in FIG. 4, and various devices and methods derived from the description above are not limit to a specific structure. To help understand the nature and operation and to more clearly illustrate of the present invention, more specific examples and embodiments are described below, without further confining the scope of the present invention.

Figure 6A:
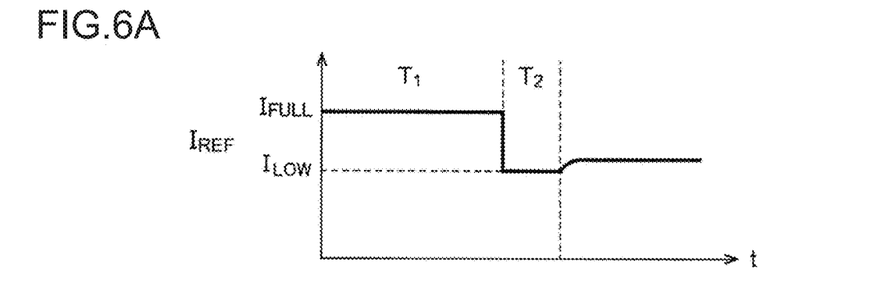
FIGS. 6A to FIG. 6D are waveform diagrams of another transition method of a current setting value in a second period.

FIGS. 6A to FIG. 6D show waveform diagrams of other transition methods of the current setting value $I_{REF}$ in the second period $T_2$. In FIG. 6A, during the process from the first period $T_1$ to the second period $T_2$, the transition to the high-efficiency setting value $I_{LOW}$ directly takes place without going through the intermediate value.

Figure 6B:
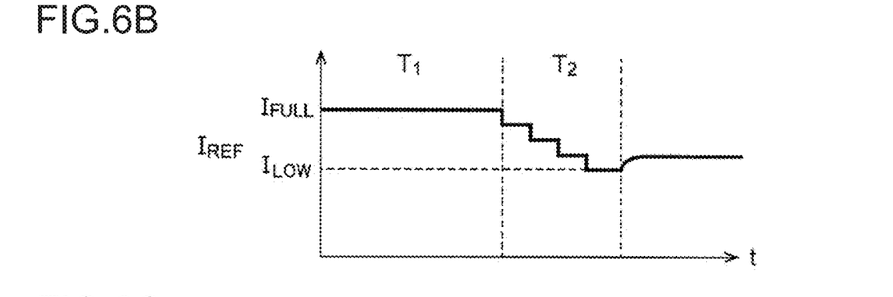

In FIG. 6B, during the process from the first period $T_1$ to the second period $T_2$, the transition to the high-efficiency setting value $I_{LOW}$ takes place by going through multiple, i.e., N, intermediate values, which are equivalent to N steps. The number N of the intermediate value is not limited.

Figure 6C:
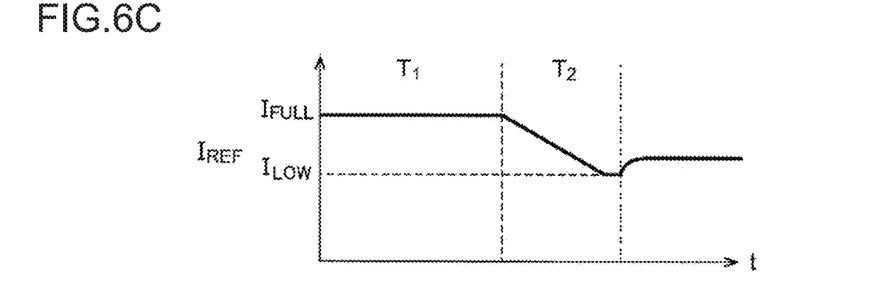

In FIG. 6C, in the second period $T_2$, the current setting value $I_{REF}$ changes linearly from the full-torque setting value $I_{FULL}$ to the high-efficiency setting value $I_{LOW}$.

Figure 6D:
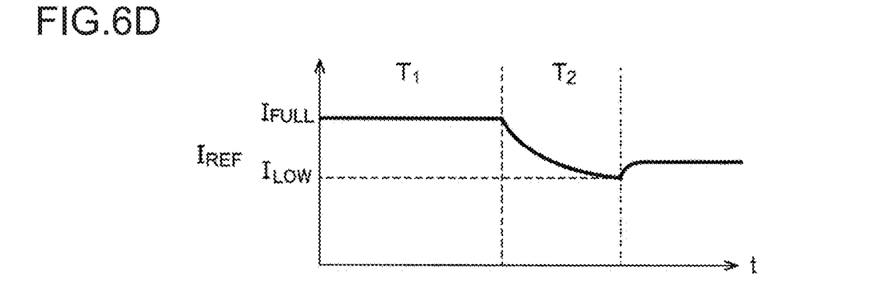

In FIG. 6D, in the second period $T_2$, the current setting value $I_{REF}$ attenuates from the full-torque setting value $I_{FULL}$ to the high-efficiency setting value $I_{LOW}$.

Figure 7:
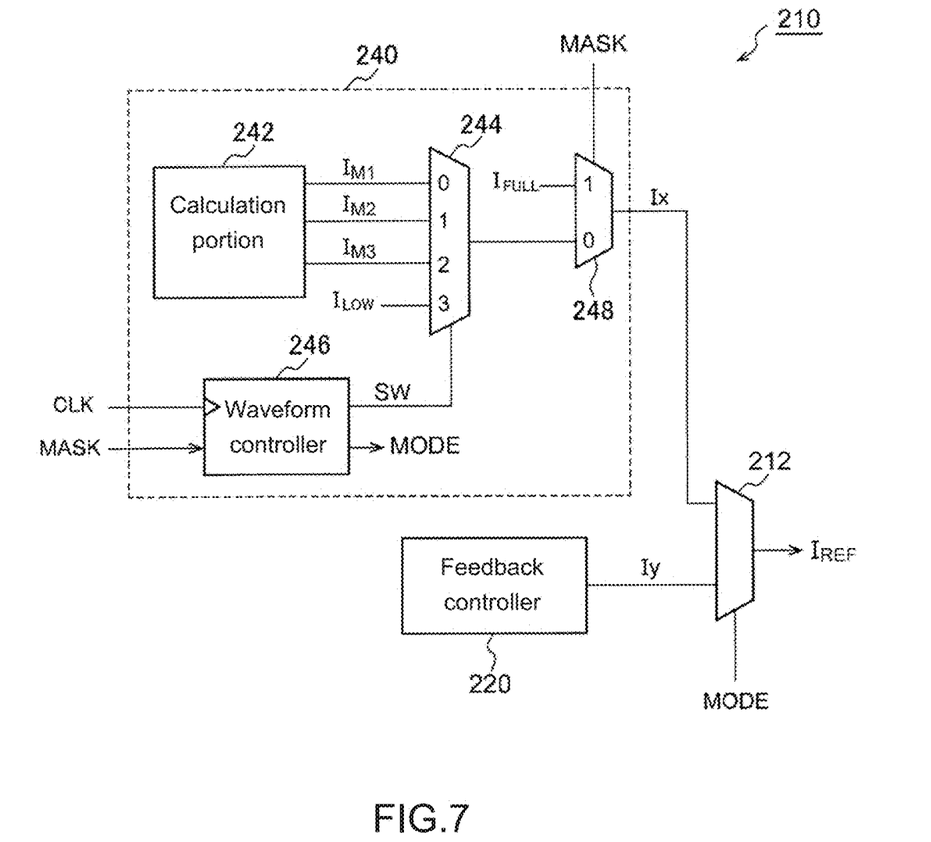
FIG. 7 is a circuit diagram of an exemplary structure of a current value setting circuit.

FIG. 7 shows a circuit diagram of a structure of the current value setting circuit 210. The current value setting circuit 210 includes a feedforward controller 240, a feedback controller 220 and a multiplexer 212.

The feedforward controller 240 is activated in the first period $T_1$ and generates a current setting value Ix. The feedback controller 220 is activated in the second period $T_2$ and generates a current setting value Iy. The multiplexer 212 selects the current setting value Ix in the first period $T_1$, and selects the current setting value Iy in the second period $T_2$. The multiplexer 212 is controlled by a mode control signal MODE.

The feedforward controller 240 can also include a calculation portion 242, a multiplexer 244, a waveform controller 246, and a multiplexer 248.

The calculation portion 242 generates at least one intermediate value $I_{M1}$ to $I_{MN}$ acquired by internally dividing the full-torque setting value $I_{FULL}$ and the high-efficiency setting value $I_{LOW}$. In this example, N equals 3.

For example, the intermediate setting values $I_{M1}$ to $I_{M3}$ can be generated by the following method.

$$IM1=(3\times I_{FULL}+1\times I_{LOW})/(N+1)$$

$$IM2=(2\times I_{FULL}+2\times I_{LOW})/(N+1)$$

$$IM3=(1\times I_{FULL}+3\times I_{LOW})/(N+1)$$

In this case, the steps have equal widths. In summary, the $i_{th}$ intermediate value is set as:

$$IMi=\{(N+1-i)\times I_{FULL}+i\times I_{LOW}\}/(N+1)$$

The multiplexer 244 receives the high-efficiency setting value $I_{LOW}$ and the at least one setting value $I_{M1}$ to $I_{MN}$, and selects one corresponding to control data SW from the setting values. In this embodiment, the control data SW is 2-bit, $I_{M1}$ is selected for [00], $I_{M2}$ is selected for [01], $I_{M3}$ is selected for [10] and $I_{LOW}$ is selected for [11].

The multiplexer 248 receives outputs of the full-torque setting value $I_{FULL}$ and the multiplexer 244. The period when the mask signal MASK is asserted (high) is the first period $T_1$, and the full-torque setting value $I_{FULL}$ is selected. When the mask signal MASK is negated (low), the output of the multiplexer 244 is selected, and the process proceeds to the second period $T_2$.

The waveform controller 246 changes the control data SW along with time when the mask signal MASK is negated. The number of steps can be set according to the sequence of the control data SW. The waveform controller 246 can synchronously change the control data SW along with an input clock S1; for example, changing the control data SW at a positive edge of each input clock S1.

The waveform controller 246 is aware of the timing at which the transition is complete, and thus the mode control signal MODE can be generated by the waveform controller 246.

For example, if the control data SW is fixed at [11] in the second period $T_2$, the waveform in FIG. 6A can be obtained. Further, if the control data SW is sequentially changed to [00], [01], [10] and [11] in the second period $T_2$, the waveform in FIG. 6B can be obtained. Further, if the control data SW is sequentially changed to [01] and [11] in the second period $T_2$, the waveform in FIG. 5A can be obtained.

Thus, various transition methods can be implemented with the same hardware by using the current value setting circuit 210 in FIG. 7.

Figure 8:
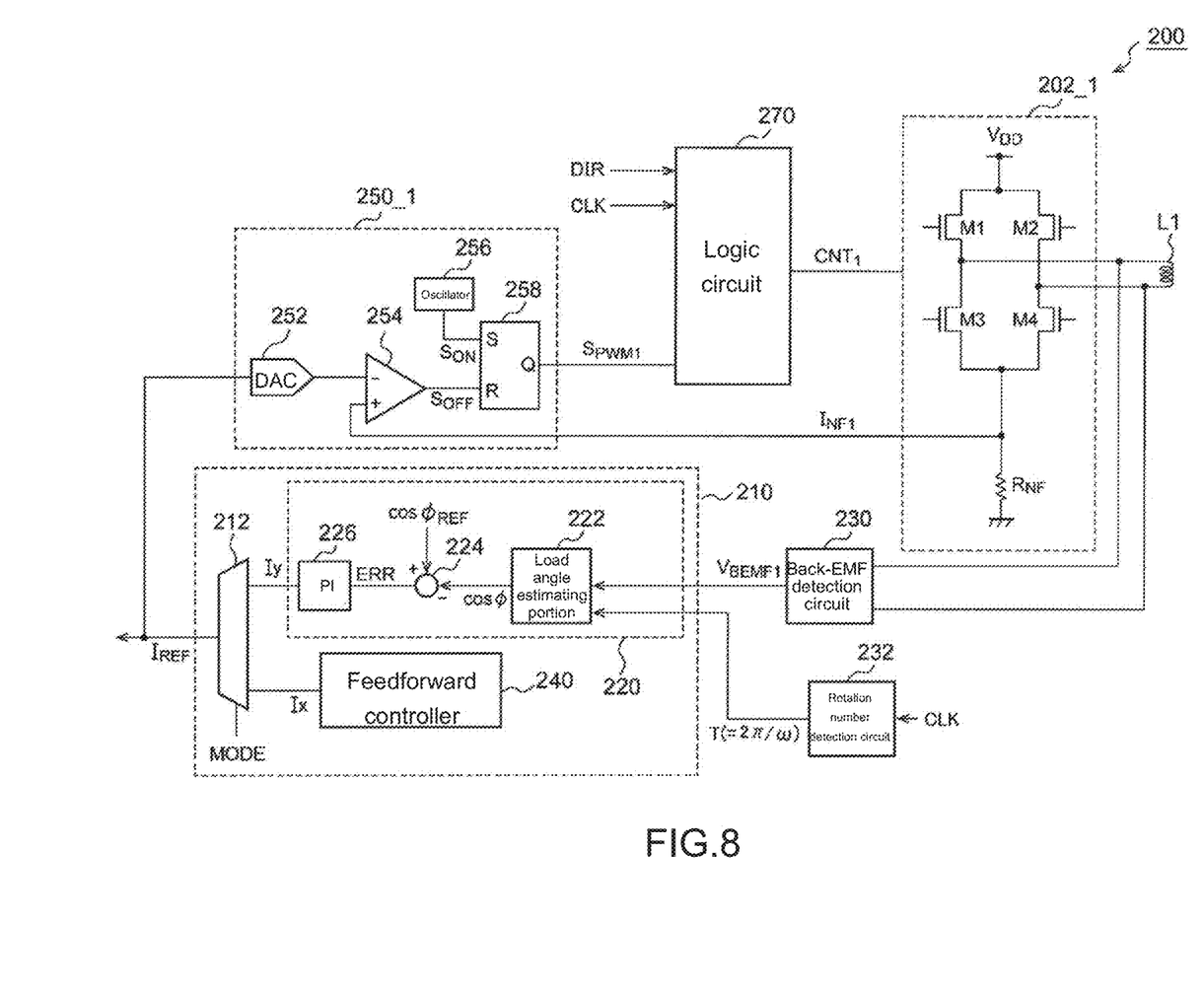
FIG. 8 is a diagram of a specific structure of a driving circuit.

FIG. 8 shows a diagram of a specific structure of the driving circuit 200. In FIG. 8, only parts related to the first coil L1 are depicted.

The counter-EMF detection circuit 230 detects a counter-EMF $V_{BEFM1}$ generated by the first coil L1. The method for detecting the counter-EMF is not specifically limited, and can be implemented by commonly known techniques. In general, the counter-EMF can be obtained by the following method: setting a detection window (detection interval), setting two ends of the coil as high impedance, and sampling the voltage of the coil at this point.

A rotation number detection circuit 232 obtains a rotation number $\omega$ (frequency) of the stepping motor 102, and generates a detection signal representing the rotation number $\omega$. For example, the rotation number detection circuit 232 can detect a period T ($=2\pi/\omega$) directly proportional to the reciprocal of the rotation number $\omega$, and output the period T as the detection signal. In a situation free from out-of-step, the frequency (period) of the input clock CLK is directly proportional to the rotation number (period) of the stepping motor 102. Thus, the rotation number detection circuit 232 can also set the detection signal by detecting the input clock CLK, or on the basis of the period of an internal signal generated thereby.

The feedback controller 220 includes a load angle estimating portion 222, a subtractor 224, a proportional integration (PI) controller 226.

The feedback controller 220 performs, in the high-efficiency mode, feedback control on the current setting value $I_{REF}(=Iy)$ according to the counter-EMF $V_{BEMF1}$. The load angle estimating portion 222 estimates a load angle $\phi$ according to the counter-EMF $V_{BEMF1}$. The load angle $\phi$ is equivalent to a difference between a current vector (i.e., position instruction) specified by the driving current flowing through the first coil L1 and the position of the rotor (mover).

The counter-EMF $V_{BEMF1}$ in the detection interval is provided according to the following equation:

$$V_{BEMF1} = K_E \cdot \omega \cdot \cos\phi$$

In the equation above, $K_E$ is an induced voltage constant, and $\omega$ is the rotation number. Thus, by measuring the counter-EMF $V_{BEMF1}$, a detection value correlated with the load angle $\phi$ can be generated. For example, $\cos\phi$ can be set as the detection value. In this case, the detection value is represented by the following equation:

$$\cos\phi = V_{BEMF1} \cdot \omega^{-1} / K_E$$
$$= V_{BEMF1} \cdot (T/2\pi) \cdot K_E^{-1}$$

The feedback controller 220 generates the current setting value Iy by way of having the estimated load angle $\phi$ approach close to the predetermined target angle $\phi_{REF}$. More specifically, the subtractor 224 generates an error ERR according to the detection value $\cos\phi$ of the load angle $\phi$ and the target value $\cos(\phi_{REF})$. The PI controller 226 performs a PI control operation by way for having the error ERR become zero and generates the current setting value Iy. Alternatively, a proportional (P) controller using a P control operation or a proportional integral derivative (PID) performing a PID control operation can be used as substitution for the PI controller. Alternatively, the processing of the feedback controller 220 can also be realized by an analog circuit using an error amplifier.

Further, the method for optimizing the current setting value Iy is not limited to the above. For example, a target value $V_{BEMF(REF)}$ of the counter-EMF $V_{BEMF1}$ can also be specified in advance, such that a feedback loop is formed by having the counter-EMF $V_{BEMF1}$ approach close to the target value $V_{BEMF(REF)}$.

The constant current chopper circuit 250_1 includes a digital-to-analog converter (DAC) 252, a PWM comparator 254, an oscillator 256, and a flip-flop 258. The DAC 252 converts the current setting value $I_{REF}$ to an analog voltage $V_{REF}$. The PWM comparator 254 compares the feedback signal $I_{NF1}$ with the reference voltage $V_{REF}$, and asserts a turn-off signal $S_{OFF}$ (setting to high) if $I_{NF1} > V_{REF}$. The oscillator 256 generates a periodic turn-on signal $S_{ON}$ specifying the chopper frequency. The flip-flop 258 outputs the pulse modulation signal $S_{PWM1}$, which changes to an on level (e.g., high) according to the turn-on signal $S_{ON}$ or changes to an off level (e.g., low) according to the turn-off signal $S_{OFF}$.

Figure 9:
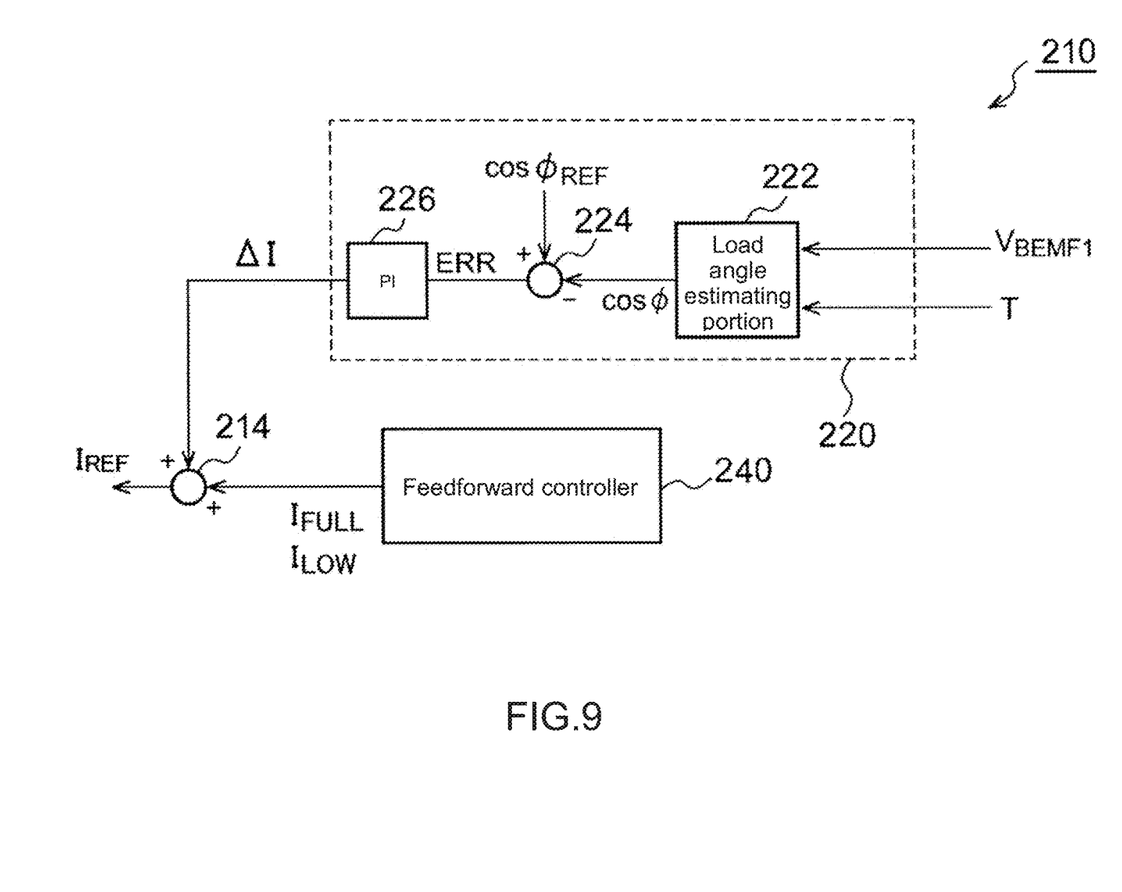
FIG. 9 is a circuit diagram of another exemplary structure of a current value setting circuit.

FIG. 9 shows a diagram of another structure of the current value setting circuit 210. The feedback controller 220 is excited in the high-efficiency mode and generates a current compensation value $\Delta I$. The value of the current compensation value $\Delta I$ is adjusted by way of having the load angle $\phi$ approach close to the target value $\phi_{REF}$. The current compensation value $\Delta I$ is zero in the first period $T_1$ and the second period $T_2$. The current value setting circuit 210 includes an adder 214 in substitution for the multiplexer 212 in FIG. 8. The adder 214 adds the high-efficiency setting value $I_{LOW}$ generated by the feedforward controller 240 and the current compensation value $\Delta I$. Thus, the current setting value $I_{REF}$ is adjusted by way of having the load angle $\phi$ approach close to the target value $\phi_{REF}$, i.e., $I_{REF} = I_{LOW} + \Delta I$.

Figure 10A:
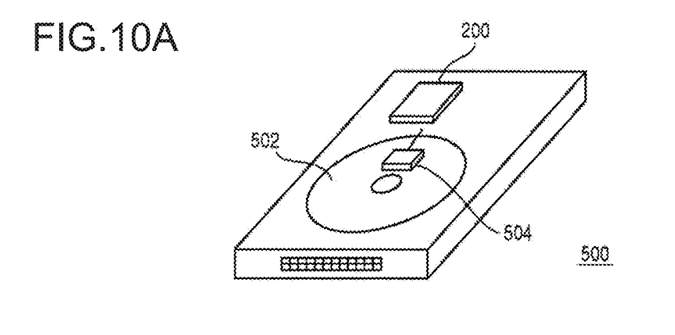
FIGS. 10A to FIG. 10C are three-dimensional diagrams of examples of an electronic machine having a driving circuit.
Figure 10B:
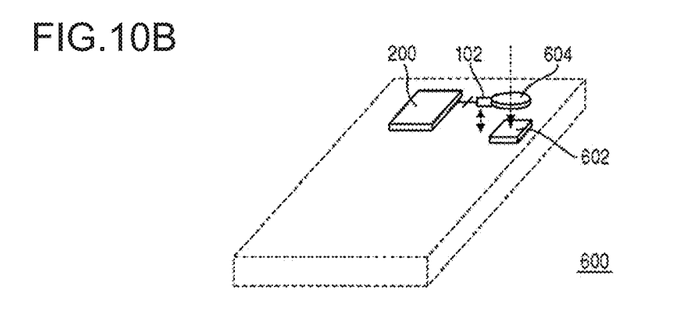
Figure 10C:
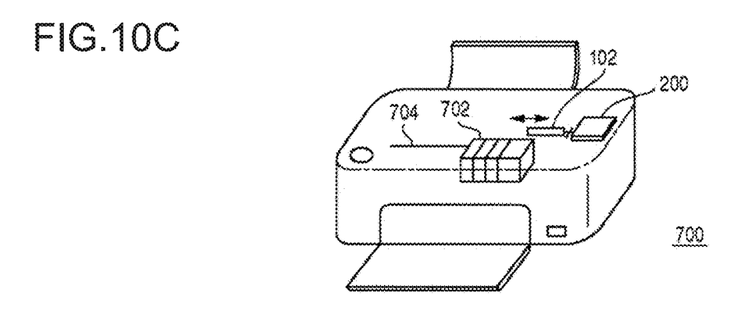

Lastly, the purpose of the driving circuit 200 is described. The driving circuit 200 is used in various electronic machines. FIGS. 10(a) to (c) show three-dimensional diagrams of examples of electronic machines including the driving circuit 200.

The electronic machine in FIG. 10A is an optical disc device 500. The optical disc device 500 includes an optical disc 502 and a reader 504. The reader 504 is provided to write data to and read data from the optical disc 502. The reader 504 is capable of moving (tracking) on a recording surface of the optical disc 502 along a radial direction of the optical disc 502. Further, the distance from the reader 504 to the optical disc is also variable (for focusing). The reader 504 is positioned by a stepping motor not shown in the drawing. The driving circuit 200 controls the stepping motor. This structure is capable of preventing out-of-step and efficiently positioning the reader 504 with high precision.

The electronic machine in FIG. 10B is a device 600 such as a digital static camera, a digital video camera or a cell phone terminal having an image capturing function. The device 600 includes a capturing element 602 and an automatic focusing lens 604. The step motor 102 performs automatic focusing by using position of lens 604. The driving circuit 200 drives the step motor 102. This structure is capable of preventing out-of-step and efficiently positioning the automatic focusing lens 604 with high precision. In addition to an automatic focusing lens, the driving circuit 200 can also be used to drive a jitter correction lens. Alternatively, the driving circuit 200 can also be used in aperture control.

The electronic machine in FIG. 10C is a printer 700. The printer 700 includes a head 702 and a guiding rail 704. The head 702 is supported and can be positioned along the guiding rail 704. The stepping motor 102 controls the position of the head 702. The driving circuit 200 controls the stepping motor 102. This structure is capable of preventing out-of-step and efficiently positioning the head 702 with high precision. In addition to being used for driving the head, the driving circuit 200 can also be used to drive a motor for a paper conveyor mechanism.

The present invention is described by way of the embodiments above. The embodiments are examples, and a person skilled in the art should understand that there are numerous variation embodiments from combinations of these constituent elements and processes. Further, such variation embodiments are to be encompassed within the scope of the present invention. Some variation embodiments are described below.

Variation Embodiment 1

In the embodiments above, a situation where the bridge circuit 202 includes a full-bridge circuit (H bridge) is given as an example; however, the present invention is not limited thereto, and a half-bridge circuit can be included. Further, the bridge circuit 202 and a driving circuit 200A (200B) can be different chips, or can be discrete parts.

Variation Embodiment 2

In the embodiments above, the two currents $I_{OUT1}$ and $I_{OUT2}$ flowing through the two coils are connected or disconnected according to the excitation position, but the current amounts thereof are constant and are not associated with the excitation position. In this case, the torque changes according to the excitation position. In substitution for the control, the currents $I_{OUT1}$ and $I_{OUT2}$ can also be corrected by a fixed means in which the torque is not associated with the excitation position. Referring to FIG. 2, for example, in 1-2-phase excitation, the current amounts of the currents $I_{OUT1}$ and $I_{OUT2}$ at the excitation positions 2, 4, 6 and 8 can be set as $\sqrt{2}$ times the current amounts at the excitation positions 1, 3, 5 and 7.

Variation Embodiment 3

The logic circuit 270 can also adjust the power voltage $V_{DD}$ supplied to the bridge circuit 202 in substitution for or in combination with the method of adjusting the duty cycle of the PMW signal S2 by way of having the load angle ϕ approach close to the target angle $\phi_{REF}$. By changing the power voltage $V_{DD}$, the power in the coils L1 and L2 of the stepping motor 102 can be changed.

The present invention has been described in terms of the embodiments above. However, these embodiments demonstrate merely principles and applications of the present invention. There are numerous variations embodiments and configuration modifications without departing from the scope of the concept of the present invention, as specified in the appended claims.

What is claimed is:

1. A driving circuit that is the driving circuit of a stepping motor, comprising:
   a current value setting circuit, adapted to generate a current setting value;
   a constant current chopper circuit, adapted to generate a pulse modulation signal, wherein the pulse modulation signal pulse modulates a detection value of a coil current flowing in a coil to be close to a target value, wherein the target value is based on the current setting value; and
   a logic circuit, adapted to control a bridge circuit connected to a coil of the stepping motor according to the pulse modulation signal,
   wherein the bridge circuit is adapted to,
   in a first period after a rotation of the stepping motor starts, set the current setting value to be a predetermined first setting value,
      in a second period after the first period, lower the current setting value to a predetermined second setting value that is smaller than the predetermined first setting value according to a predetermined pattern, and
      in a third period after the second period, modify the current setting value by a feedback control such that the stepping motor is operated in a high efficiency mode,
   wherein the current value setting circuit is adapted to generate the current setting value in the first period and the second period by a feedforward control, and generate the current setting value having a convergence value in the high efficiency mode.

2. The driving circuit according to claim 1, wherein the current value setting circuit changes the current setting value in N steps from the first setting value to the second setting value in the second period, where N is more than or equal to 2.

3. The driving circuit according to claim 2, wherein the current value setting circuit comprises:
   a calculation portion, generating at least one intermediate value acquired by internally dividing the first setting value and the second setting value;
   a multiplexer, receiving the first setting value, the second setting value and at least one of the setting value, and selecting one of the setting value corresponding to a control data; and
   a waveform controller, changing the control data along with the time in the second period.

4. The driving circuit according to claim 2, wherein the widths of the steps are equal.

5. The driving circuit according to claim 1, wherein the current value setting circuit comprises:
   a calculation portion, generating at least one intermediate value acquired by internally dividing the first setting value and the second setting value;
   a multiplexer, receiving the first setting value, the second setting value and at least one of the setting value, and selecting one of the setting value corresponding to a control data; and
   a waveform controller, changing the control data along with the time in the second period.

6. The driving circuit according to claim 1, wherein the logic circuit generates a mask signal according to period of an input clock, wherein the mask signal regulates triggering of the transition from the first period to the second period.

7. The driving circuit according to claim 1, further comprising a counter-electromotive force (EMF) detection circuit, detecting a counter-EMF generated by the coil, wherein the current value setting circuit performs feedback control on the current setting value according to the counter-EMF in the high-efficiency mode.

8. The driving circuit according to claim 7, wherein the current value setting circuit further comprises:
   a load angle estimating portion, estimating a load angle according to the counter-EMF; and
   a feedback controller, generating the current setting value by having the estimated load angle approach to a predetermined target angle.

9. The driving circuit according to claim 1, wherein the driving circuit is integrated on a semiconductor substrate.

10. An electronic machine, comprising a stepping motor; and driving the stepping motor by the driving circuit of claim 1.

11. A driving method that is the driving method for a stepping motor, comprising:
   in a first period after a rotation of the stepping motor starts, setting a current setting value to a predetermined first setting value by a feedforward control;
   in a second period after the first period, lowering, by the feedforward control, the current setting value to a predetermined second setting value that is smaller than the predetermined first setting value according to a predetermined pattern;
   in a third period after the second period, modifying the current setting value by a feedback control to have a convergence value such that the stepping motor is operated in a high efficiency mode;
   generating a pulse modulation signal, wherein the pulse modulation signal pulse modulates a detection value of a coil current flowing in a coil to be close to a target value, wherein the target value is based on the current setting value; and
   controlling a bridge circuit connected to a coil of the stepping motor according to the pulse modulation signal.

* * * * *